US008839371B2

(12) United States Patent
Ghosh et al.

(10) Patent No.: US 8,839,371 B2
(45) Date of Patent: Sep. 16, 2014

(54) METHOD AND SYSTEM FOR SECURING ACCESS TO A STORAGE DEVICE

(75) Inventors: Atish Ghosh, Austin, TX (US); Mark Bohm, Village of Bear Creek, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 88 days.

(21) Appl. No.: 12/868,724

(22) Filed: Aug. 26, 2010

(65) Prior Publication Data
US 2012/0054832 A1 Mar. 1, 2012

(51) Int. Cl.
G06F 21/00 (2013.01)
H04L 9/08 (2006.01)
H04L 9/32 (2006.01)

(52) U.S. Cl.
CPC ............ H04L 9/0866 (2013.01); H04L 9/3226 (2013.01); H04L 2209/80 (2013.01)
USPC ............................................... 726/4; 713/186

(58) Field of Classification Search
USPC .............. 726/4, 5, 18, 21; 711/147–153, 163, 711/164; 713/155–159
See application file for complete search history.

(56) References Cited

U.S. PATENT DOCUMENTS

| 7,277,995 | B2 * | 10/2007 | Davies et al. | 711/154 |
| 7,519,829 | B2 * | 4/2009 | Chou et al. | 713/186 |
| 2003/0156740 | A1 * | 8/2003 | Siegel et al. | 382/115 |
| 2003/0226025 | A1 * | 12/2003 | Lin et al. | 713/193 |
| 2004/0243779 | A1 * | 12/2004 | Okaue et al. | 711/166 |
| 2007/0011466 | A1 * | 1/2007 | Imura | 713/186 |
| 2008/0022361 | A1 * | 1/2008 | Bharadwaj et al. | 726/2 |
| 2008/0066158 | A1 * | 3/2008 | Dillaway et al. | 726/4 |
| 2009/0240907 | A1 * | 9/2009 | Crandell | 711/163 |
| 2010/0179831 | A1 * | 7/2010 | Brown et al. | 705/3 |
| 2010/0293374 | A1 * | 11/2010 | Bushby | 713/168 |

FOREIGN PATENT DOCUMENTS

| EP | 2028603 A1 * | 2/2009 | G06F 21/02 |
| ZA | 2007/02151 * | 3/2007 | H04L 9/32 |

OTHER PUBLICATIONS

Tom Olzak "Data Storage Security" Adventures in Security, Feb. 2006.*

* cited by examiner

Primary Examiner — Jason K Gee
Assistant Examiner — Maung Lwin
(74) Attorney, Agent, or Firm — King & Spalding L.L.P.

(57) ABSTRACT

A method and system for securing access to a storage device including one or more locked logical sections. The method includes providing an interface device including a first port connected to a computing system and a second port connected to the storage device. Further, the method includes receiving a unique identifier from a wireless device, and deriving a key from the unique identifier. Based on the derived key, the method unlocks a logical section in the storage device. The method may further store access permission rights for the locked logical sections in the interface device and unlock the logical section based on the access permission rights. Moreover, the method may further authenticate the identity of a user of the wireless device for unlocking the storage device.

18 Claims, 3 Drawing Sheets

METHOD AND SYSTEM FOR SECURING ACCESS TO A STORAGE DEVICE

TECHNICAL FIELD

The present application relates generally to storage devices, and more specifically to a method and a system for securing access to the storage devices.

BACKGROUND

Even though data security has been of paramount concern over the last few decades, vast majority of the data stored in typical memory media is still not safe from unauthorized access. In organizations, the threat of unauthorized access is ever looming and data access restriction is a very crucial task for the various departments of these organizations. For example, loss of intellectual property data can prove fatal for most organizations. It may also be important to provide different types of access rights to confidential or sensitive data to the employees in an organization. Further, loss of portable devices such as laptops or external storage devices poses a threat to data security and personal privacy.

Certain memory storage devices protect data from unauthorized access with the help of SmartCard interfaces. A SmartCard is a pocket-sized card which on contact with the memory storage device allows access to data stored on the storage device if the SmartCard is authentic. The SmartCard may be removed from contact with the storage device to protect the storage device. A user must remember to remove the SmartCard from contact with the storage device, after every use to prevent unauthorized access and data theft. There are high chances that the SmartCard will be left attached, leaving the hard drive completely vulnerable. Even if the SmartCard is protected by a PIN, there is always a possibility of hacking the PIN as the SmartCard is physically available to a hacker.

Some other storage devices may encrypt the data using a password to prevent unauthorized data access. It is, however, not only difficult to memorize and remember the password but also one cannot completely rely on the data security offered.

Thus, current solutions do not completely protect the confidentiality, integrity, and availability of information from unauthorized or insecure access to a storage device. As a result, there exists a need to secure access to a storage device. There is a further need for a method and a system to allow different types of access for a user group to a memory device, segregated into multiple logical devices. The logical devices may be locked or unlocked by individual members of the group based on each person's access permission rights.

SUMMARY

One embodiment of the present application describes an interface device for securing access to a storage device including one or more locked logical sections. The interface device includes a first port, and a second port configured to be operatively coupled to a computing system, and the storage device respectively. Moreover, a wireless signal detector is configured to receive a unique identifier from a wireless device. The interface device further includes a controller operatively coupled to the first port, the second port, and the wireless signal detector. The controller derives a key from the unique identifier and unlocks a logical section in the storage device based on the derived key.

Another embodiment of the application describes a method for securing access to a storage device including one or more locked logical sections. The method provides an interface device including a first port connected to a computing system and a second port connected to the storage device. The method receives a unique identifier from a wireless device, and derives a key from the unique identifier. Based on the derived key, the method unlocks a logical section in the memory storage.

Certain embodiments of the disclosure may provide various technical advantages. For example, certain implementations may provide greater security than do current data access systems. As embodiments of the claimed application dynamically lock or unlock a logical section of the storage device based on user authentication, data is better protected.

These and other advantages, features, and objects of the claimed application will become apparent upon review of the following detailed description of the preferred embodiments when taken in conjunction with the drawings and the appended claims.

BRIEF DESCRIPTION OF THE FIGURES

The figures described below set out and illustrate a number of exemplary embodiments of the disclosure. Throughout the drawings, like reference numerals refer to identical or functionally similar elements. The drawings are illustrative in nature and are not drawn to scale.

Figure 1:
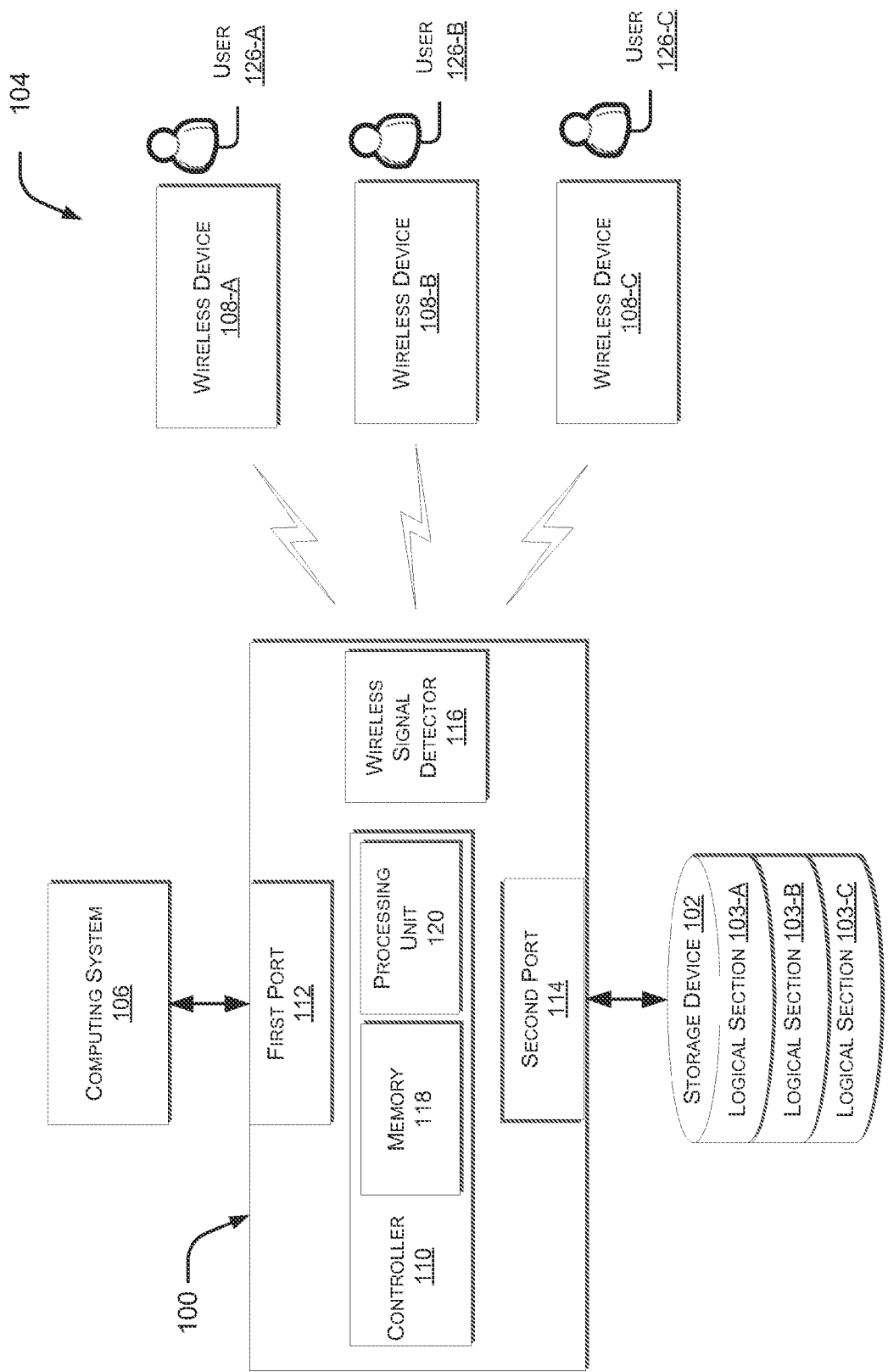
FIG. 1 is a block diagram illustrating an exemplary interface device for securing access to a storage device in an exemplary environment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Overview

Embodiments of the present application are directed to systems and methods for securing access to a storage device including one or more logical sections. Typically, systems include replaceable cards which a user must remember to remove from the storage device, after every use, to prevent unauthorized access.

Embodiments of the present application apply security to a computing device or a storage device. Even if the device is stolen, the data on device memory cannot be read by a person lacking the authentication code. Moreover, in the secure mode, the device does not even boot, as the entire memory including the file system is encoded, rendering the memory useless. The decoding of files and their use is gated by the presence or absence of the user and the associated security device. Embodiments of the present application may be utilized with internal system drives, such as those used in a laptop or desktop computer, as well as with external expansion drives, such as those used for bulk storage or data file expansion.

Embodiments of the present application provide an interface device between a computing system and a memory (internal or external, such as a hard drive), segregated into one or more logical sections. The interface device encrypts the data on all logical sections using an encryption key derived from a wireless device which may be used for authenticating a user. By encrypting the data on all logical sections, the interface device provides complete protection even to the memory's swap space. For instance, if only particular files are encrypted, an operating system (OS) decrypts these files while using them. The decrypted version of the files is present in memory, and individual files can be copied into the OS swap space. The interface device renders the memory unusable if the computing system is out of range of the wireless device, thereby protecting data without human intervention.

Exemplary Systems

FIG. 1 illustrates an exemplary interface device 100 in an exemplary environment 104 operable to allow secure access to a storage device 102. The storage device is segregated into multiple logical sections 103-A, 103-B and 103-C (logical sections 103). The environment 104 further includes a computing system 106 which is operatively coupled to the interface device 100 through a first port 112. The storage device 102 is operatively coupled to the interface device 100 through a second port 114. One or more users 126-A, 126-B, 126-C (users 126) may request access to the storage device 102 through wireless devices 108-A, 108-B, 108-C (wireless device 108). The interface device 100 further includes a controller 110 for managing data flow between the computing system 106 and storage device 102, and a wireless signal detector 116 for receiving signals from the wireless devices 108. The controller 110 is operatively coupled to the first port 112, the second port 114, and the wireless signal detector 116. The controller 110 includes a memory 118 and a processing unit 120.

The computing system 106 generally refers to a system through which the storage device 102 is accessed. The computing system 106 may include a computing device, such as a mainframe or a personal computer (PC), or a computer-related electronic device such as a DVD player, television, and the like. Basically, any device employing a memory can profit from devices produced according to the present disclosure. One or more users 126 may want to access one or more logical sections 103 through the computing system 106. For instance, a user 126-A may want to see a movie or gain access to the data stored on the logical section 103-A using the computing system 106. The computing system 106 sends an access request signal to the controller 110 to permit access to the logical sections 103. If the user 126-A performs the required authentication, the data flow is permitted between the logical device 102-A and the computing system 106.

The storage device 102 contains data in any form such as text, images, audio, video, or the like. The storage device 102 may lie within the computing system 106 or be external to the computing system 106. The storage device may include a hard drive, a memory card, or the like. Each logical section 103 of the storage device 102 is separately locked. The data present on the logical sections 103 may be encrypted using any known encryption technique, such as AES encryption, hardware encryption, software encryption, or a combination of these. A user 126 may access a logical section 103 based on the access permission rights granted for that user. For example, access permission rights may be defined for each of the members of a user group A as well as for the user group A. Additionally, the user group A consisting of multiple users may either have same or different access permission rights from a user group B, also consisting of multiple users. The access permission rights are stored in the memory 118 of the interface device 100.

The first port 112 and the second port 114 employ a communication interface which may include a universal serial bus (USB), a FireWire, a serial advanced technology attachment (SATA), a parallel advanced technology attachment (PATA), or a peripheral component interconnect (PCI) express. For instance, the computing system 106 may be connected to the interface device 100 through a USB connection while the storage device 102 may be connected to the interface device 100 using a SATA interface. Those in the art will appreciate that both the first port 112 and the second port 114 may also employ the same communication interface.

As the interface device 100 comes within the range of the wireless device 108, the wireless device 108 may either be self-activated or may be activated by the user 126. The wireless device 108 sends a unique identifier to the wireless signal detector 116 signaling the presence of one of the users 126. Before sending the unique identifier, the user 126 may encrypt it using AES encryption, hardware encryption, software encryption, or a combination of these; or the unique identifier may also be sent without encryption. The unique identifier may be unique to each of the users 126. A user 126 may send the unique identifier using wireless devices 108 such as a radio frequency device, a bluetooth device, an infra-red device, a near-field communication device, a Wi-Fi device, a cellular phone or the like.

The interface device 100 communicates with the wireless device 108 through the wireless signal detector 116. On receiving the unique identifier from the wireless device 108, the wireless signal detector 116 may transfer the identifier to the controller 110. The controller 110 may either store the identifier in the memory 118 or send it directly to the processing unit 120 for further processing. The wireless device 108 and the wireless signal detector may also communicate with each other using synchronization information signals or other information signals known in the art.

The memory 118 of the controller 110 may store information containing the unique identifier. Additionally, the access permission rights of a user may be stored in the memory 118 which may include a ROM, a RAM or the like. The processing unit 120 may also store other information in the memory 118 depending on its processing needs.

The processing unit 120 may either fetch the stored unique identifier from the memory 118 or receive the unique identifier directly from the controller 110 for processing. The processing unit 120 may determine whether the unique identifier is encrypted or not. The determination may be based on data contained in the identifier such as its header. If the unique identifier is encrypted, the processing unit 120 decrypts it. The unique identifier may further include a key. The processing unit 120 derives the key and determines whether the key is authentic or not. If the derived key is authentic, the processing unit 120 unlocks a logical section in the storage device 102 based on the access permission rights for the key. The data contents of the unlocked logical section are decrypted and may be accessed through the computing system 106 by the user 126. The processing unit 120 may also be used to encrypt the data contents of one or more logical sections 103.

Exemplary Methods

Figure 2:
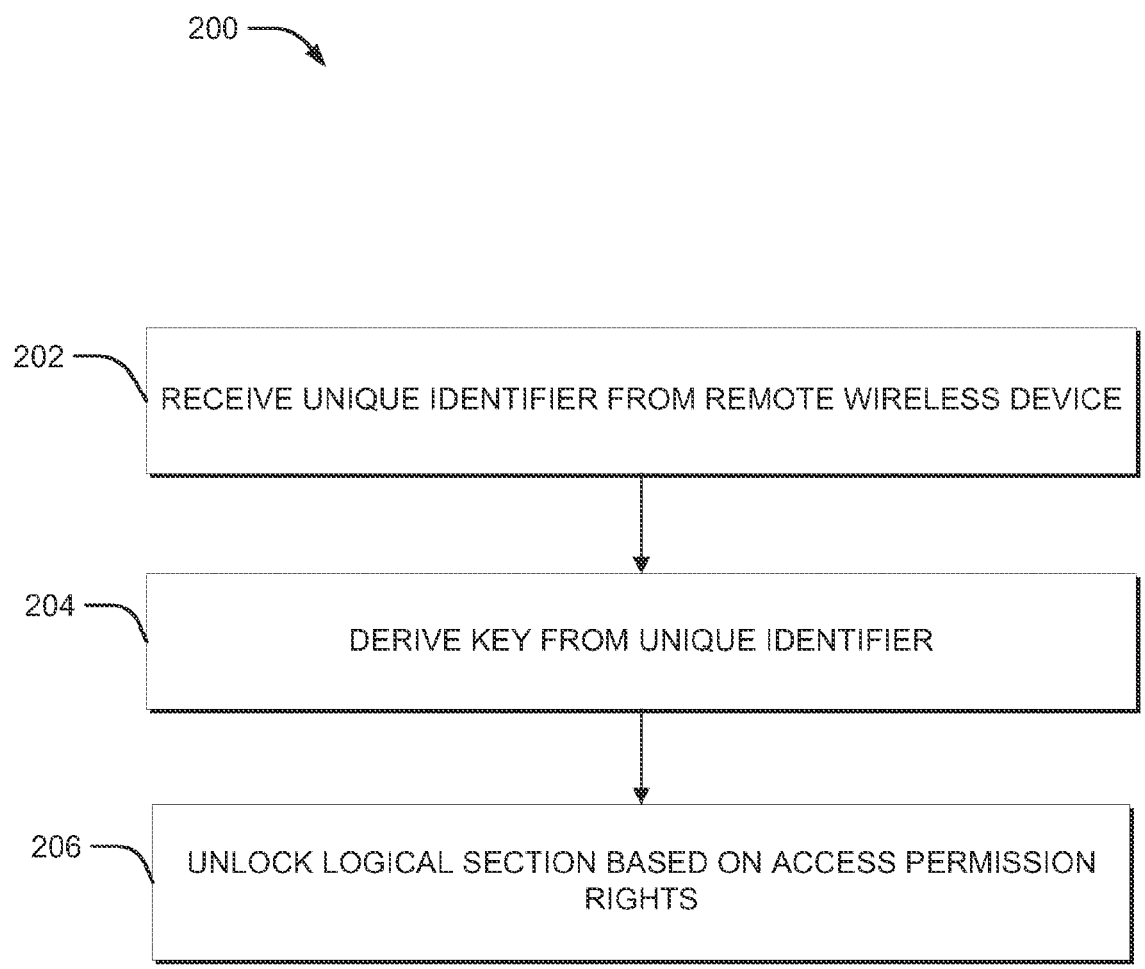
FIG. 2 is a flow chart illustrating an exemplary method for securing access to a storage device.

FIG. 2 illustrates an exemplary method 200 for securing access to a storage device 102. The method illustrated in FIG. 2 may be used in conjunction with the system shown in the previously described figure, among other devices. In various embodiments, some of the method elements shown may be performed concurrently, in a different order than shown, or may be omitted. Additional method elements may be performed as desired.

Consider a scenario where a user group consists of N user members, and each user 126 possesses an individual wireless device 108. The user group can be formed of employees, family members, or patients and doctors of a hospital. One of the users 126-A wants to access a locked logical section 103-A of the storage device 102. Whenever the user 126-A comes in proximity to the wireless signal detector 116, the user may either activate the wireless device 108 or the wireless device 108 may be self-activated. The proximity refers to the range of the wireless device 108. On activation, the wireless device 108 transmits an identifier, such as the unique identifier.

At step 202, the wireless signal detector 116 receives the unique identifier from the wireless device 108 of one or more users 126 desiring access to the storage device 102. The received unique identifier may either be in encrypted form or may be without any encryption. The processing unit 120 may analyze the unique identifier such as its header to determine whether the identifier is encrypted or not. If the unique identifier is encrypted, the processing unit 120 may decrypt and store it in the memory 118.

At step 204, the processing unit 120 derives a key from the unique identifier. The key may be similar to the unique identifier, a part of the unique identifier, or may be determined using the unique identifier. The processing unit 120 may also fetch the key from the memory 118 corresponding to the received unique identifier. The processing unit 120 uses the derived key for further processing.

At next step 206, the processing unit 120 determines whether the key is authentic or not based on the access permission rights for the key. The memory 118 stores access permission rights corresponding to various keys. For example, the user 126-A, having a key, may have the permission rights to only read the logical section 103-A while another user 126-B, having another key, may have the right to read as well as write on the logical section 103-A. Such information regarding the access permission rights corresponding to various keys is stored on the memory 118. If the derived key is authentic, the processing unit 120 unlocks a logical section 103 corresponding to the key in the storage device 102. The data contents of the unlocked logical section 103 are decrypted and may be accessed through the computing system 106 by the user 126.

In another embodiment, the step 206 may further comprise authenticating the identity of a user 126 of the wireless device 108. The controller 110 may require the user 126 to authenticate his identity by using one or more of biometric identification, visual appearance, face recognition data, digital signatures, fingerprints, voice recognition, still images, video images, other human identification information, or a login procedure. On authenticating the identity of the user, the processing unit 120 unlocks a logical section in the storage device 102 and the data contents of the unlocked logical section are decrypted. For example, the vice president (VP) of an organization may be provided full access to one or more logical sections 103 on authenticating his identity. Alternatively, an associate in the same organization may be provided restricted or no access, even if the associate is able to provide authentication information and the correct key. It will be understood that the examples stated here merely aid in understanding different embodiments of the disclosure and not to limit the scope of the claimed invention.

In another embodiment, the step 206 may further comprise disabling the computing system 106, upon a determination that one or more of the locked logical sections 103 cannot be unlocked. If the derived key is not authentic, the processing unit 120 may disable the computing system 106 either temporarily or permanently. Also, the disabled computing system 106 may be disabled only for the derived key or for all the keys. Additionally, the disabling step may disable either only a few components or all of the components of the computing system 106. The disabling step may be performed for security reasons for highly confidential data.

In another embodiment, the processing unit 120 may disable the storage device 102, upon a determination that one or more of the locked logical sections 103 cannot be unlocked. If the derived key is not authentic, the processing unit 120 may disable the storage device 102 either temporarily or permanently. The disabled storage device 102 may be disabled only for the derived key or for all the keys. Additionally, the disabling step may disable one or more logical sections 103 of the storage device 102.

Figure 3:
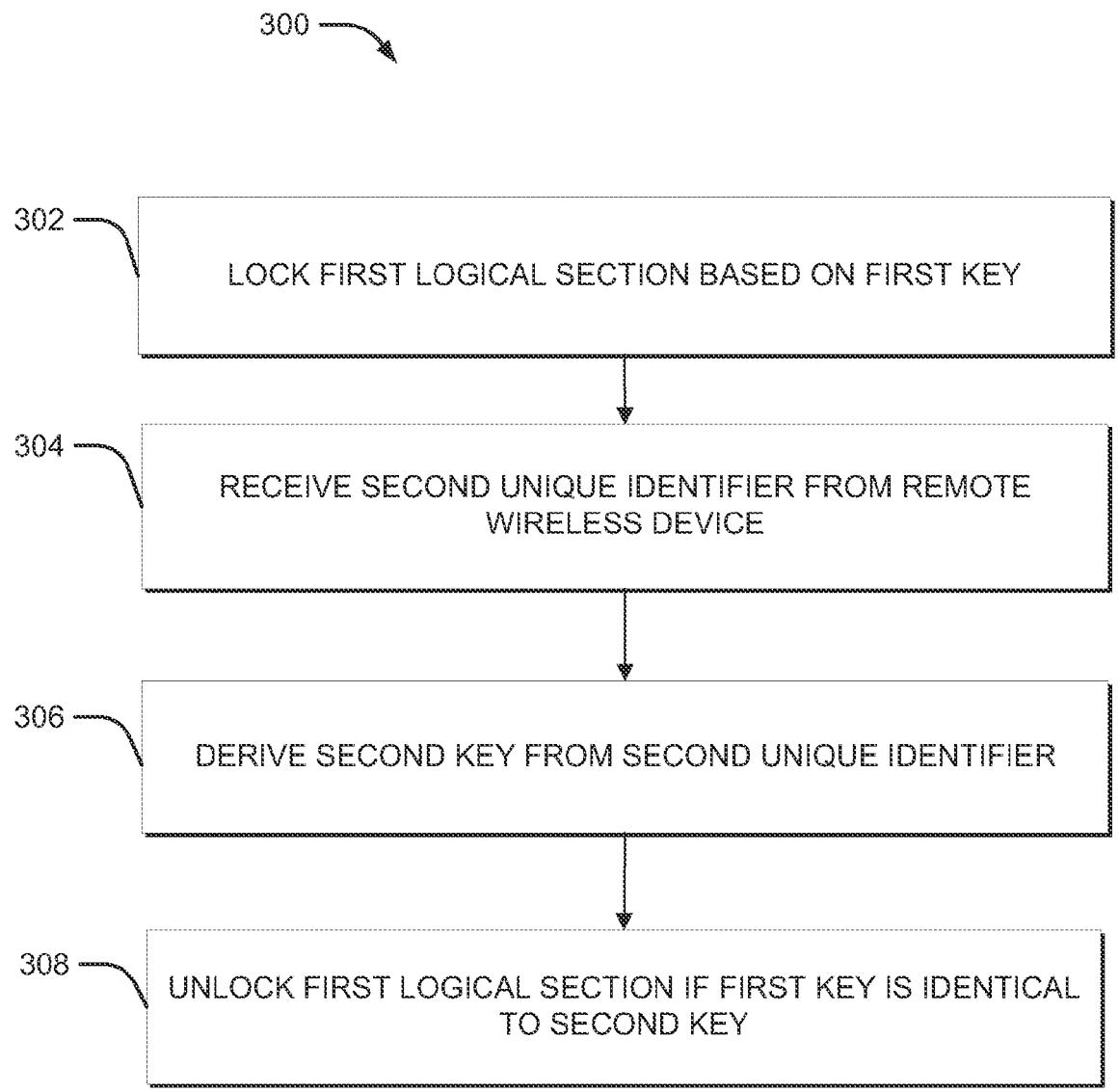
FIG. 3 is a flow chart illustrating an alternative embodiment for securing access to a storage device.

FIG. 3 illustrates an alternative embodiment for securing access to a storage device. The method illustrated in FIG. 3 may be used in conjunction with any of the systems, devices, or methods shown in the previously described figures, among other devices. In various embodiments, some of the method elements shown may be performed concurrently, in a different order than shown, or may be omitted. Additional method elements may be performed as desired. As shown, the method 300 may operate as follows.

At step 302, the interface device 100 locks a first logical section of the storage device 102 based on a first key. The processing unit 120 encrypts the data contents of one or more logical sections 103 using an encryption algorithm know in the art. A first key may be derived from a first unique identifier received from a first wireless device 108-A. For instance, consider a situation, where a father does not want his child to have access to data content present on one of the logical sections 103-A for maintaining parental control over the child. The father may lock the corresponding logical section 103-A by sending a first unique identifier through the wireless device 108-A to the interface device 100. The interface device 100 derives a first key on receiving the first unique identifier and locks the desired logical section 103-A.

At step 304, the wireless signal detector 116 receives a second unique identifier from a wireless device 108-B of a user 126-B desirous of accessing the storage device 102. For example, a mother may want to access the data content on the storage device 102 which was locked by the father for parental control over child. To this end, the mother sends a second unique identifier from her wireless device 108-B to the wireless signal detector 116.

The method 300 continues to step 306 where the controller 110 derives a second key from the second unique identifier. The second key may be similar to the second unique identifier, a part of the second unique identifier, or may be determined using the second unique identifier. The processing unit 120 may also fetch the second key from the memory 118 corresponding to the received second unique identifier. The processing unit 120 uses the derived second key for further processing.

Moving to the next step 308, the controller 110 determinates that the first key is identical to the second key. If the first key is identical to the second key, the controller 110 unlocks the first logical section 103-A in the storage device. The data contents of the unlocked logical section 103-A are decrypted and may be accessed through the computing system 106. For example, the second key derived from the second unique identifier received from the mother's wireless device 108-B is used by the controller 110 for determining whether the second key is identical to the first key. If the second key is identical to the first key, the logical section 103-A is decrypted and unlocked for access by the mother. Those in the art will appreciate that identical keys may be derived from two different unique identifiers The interface device 100 may store access permission rights for the locked logical sections 103. For example, the child may have the access permission rights to see a logical section 103-A but may not be permitted to see another logical section 103-B while the mother may have access to see both the logical sections 103-A as well as 103-B. Such information regarding the access permission rights corresponding to various logical sections 103 is stored on the memory 118.

In another embodiment, the step 308 may further comprise evaluating the access permission rights for the wireless device 108. The access permission rights for the logical section 103 desired to be accessed by one or more users 126 are determined for the wireless device 108. If the access permission rights allow the user 126, from whom the second unique identifier is received, the controller 110 unlocks the first logical section in the storage device 102.

Thus, the interface device 100 may protect the data content of one or more logical sections 103 of storage device 102 from unauthorized access by locking and unlocking the storage device 102 using the wireless devices 108. Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An interface device for securing access to a storage device, the interface device comprising:
   a first port configured to be operatively, physically coupled to a computing system;
   a second port configured to be operatively, physically coupled to the storage device including a plurality of encrypted logical sections;
   a wireless signal detector configured to receive a unique identifier from a wireless device; and
   a controller operatively coupled to the first port, the second port, and the wireless signal detector, wherein the controller is configured to store access permission rights for accessing the plurality of logical sections and wherein the controller is further configured to decrypt the plurality of logical sections based on the access permission rights corresponding to a plurality of derived cryptographic keys and wherein the controller is configured to:
   derive a cryptographic key from the unique identifier;
   decrypt a logical section of the plurality of encrypted logical sections in the storage device using the derived cryptographic key; and
   disable access to the decrypted logical section in the storage device if the wireless device is not in range of the wireless signal detector.

2. The interface device of claim 1, wherein the controller includes a memory configured to store the access permission rights.

3. The interface device of claim 1, wherein the controller is further configured to authenticate the identity of a user of the wireless device.

4. The interface device of claim 3, wherein the controller authenticates the identity of the user using one or more of biometric identification, or a login procedure.

5. The interface device of claim 1, wherein the encrypted logical sections are encrypted using one or more of AES encryption, hardware encryption, or software encryption.

6. The interface device of claim 1, wherein the first port and the second port employ a communication interface including at least one of a universal serial bus, a Fire Wire, a serial advanced technology attachment, a parallel advanced technology attachment, or a peripheral component interconnect express.

7. The interface device of claim 1, wherein the storage device lies within the computing system.

8. The interface device of claim 1, wherein the storage device is external to the computing system.

9. The interface device of claim 1, wherein the wireless device includes at least one of a radio frequency device, a Bluetooth device, an infra-red device, a near-field communication device, a Wi-Fi device, or a cellular phone.

10. A method for securing access to a storage device including a plurality of encrypted logical sections, method comprising:
    providing an interface device including a first port physically connected to a computing system and a second port physically connected to the storage device;
    storing access permission rights for the plurality of encrypted logical sections in the interface device;
    receiving a unique identifier from a wireless device wherein the unique identifier is received by a wireless signal detector coupled to the interface device;
    deriving a cryptographic key from the unique identifier;
    decrypting a logical section of the plurality of encrypted logic sections in the storage device based on the derived cryptographic key and based on the access permission rights corresponding to the derived cryptographic key; and
    disabling the decrypted logical section in the storage device if the wireless device is not in range of the wireless signal detector.

11. The method of claim 10 further comprising authenticating the identity of a user of the wireless device.

12. The method of claim 11, wherein the identity of the user is authenticated using one or more of biometric identification, or a login procedure.

13. The method of claim 10, wherein the locked logical sections are encrypted using one or more of AES encryption, hardware encryption, or software encryption.

14. The method of claim 10, wherein the storage device lies within the computing system.

15. The method of claim 10, wherein the storage device is external to the computing system.

16. The method of claim 10, wherein the wireless device includes at least one of a radio frequency device, a Bluetooth device, an infra-red device, a near-field communication device, a Wi-Fi device, or a cellular phone.

17. The method of claim 10 further comprising disabling the computing system, upon a determination that one or more of the encrypted logical sections cannot be decrypted.

18. A method for securing access to a storage device including a plurality of logical sections, the method comprising:
    providing an interface device including a first port physically connected to a computing system and a second port physically connected to the storage device wherein the storage device includes a plurality of logical sections that comprise the persistent storage and the volatile memory of the storage device;
    storing access permission rights for the plurality of encrypted logical sections in the interface device:
    encrypting a first logical section of the plurality of logical sections based on a first cryptographic key, wherein the first cryptographic key is derived from a first unique identifier received from a first wireless device;

receiving a second unique identifier from a wireless device wherein the second unique identifier is received by a wireless signal detector coupled to the interface device;

deriving a second cryptographic key from the second unique identifier;

decrypting the first logical section in the storage device upon a determination that the first cryptographic key is identical to the second cryptographic key and that the wireless device can access the encrypted logical sections based on the access permission rights; and disabling the decrypted logical section in the storage device if the wireless device is not in range of the wireless signal detector.

* * * * *